March 24, 1936.  R. N. GRAHAM ET AL  2,035,428

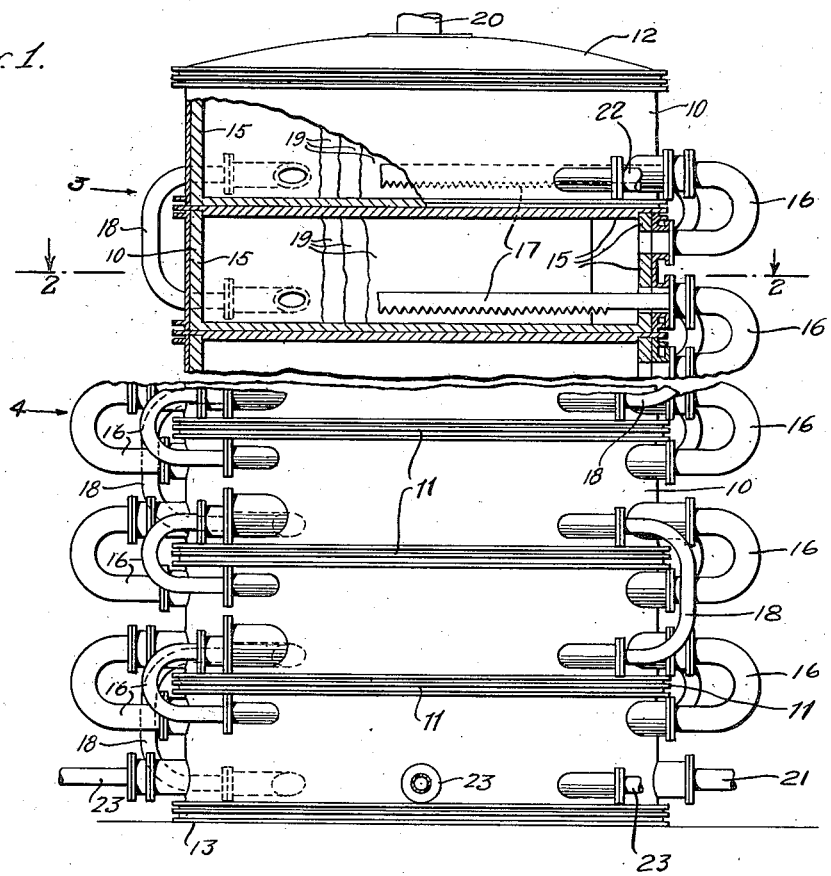
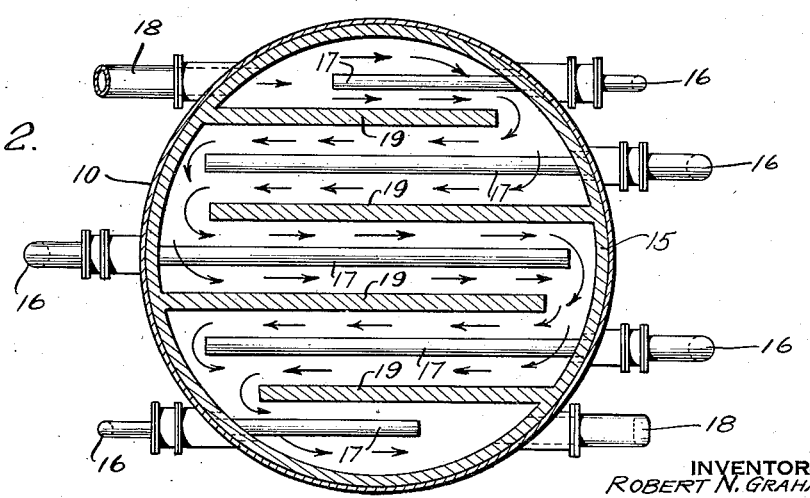

DISTILLATION APPARATUS

Filed Aug. 31, 1932  2 Sheets-Sheet 2

INVENTORS
ROBERT N. GRAHAM &
WILLIAMS F. BRACKETT
BY
ATTORNEY

Patented Mar. 24, 1936

2,035,428

UNITED STATES PATENT OFFICE 2,035,428

DISTILLATION APPARATUS

Robert N. Graham, South Charleston, and William S. Brackett, Charleston, W. Va., assignors, by mesne assignments, to Union Carbide and Carbon Corporation, a corporation of New York Application August 31, 1932, Serial No. 631,216

6 Claims. (Cl. 202—158)

The invention relates to an apparatus for separating volatile and non-volatile components of liquid mixtures by means of vapor distillation. In particular, an improved apparatus is provided for effecting such separation from mixtures which contain constituents corrosive to iron and to common metals, and which in consequence cannot be handled or processed in ordinary equipment. A principal application of the invention is in the separation of alcohols, ethers, and volatile components from water and sulfuric acid mixtures occurring in the production of alcohols from alkyl sulfates by hydrolysis. The apparatus may also find application where other similar problems of separating constituents of liquid mixtures are encountered whether the constituents to be separated are corrosive or not. For this reason the invention is not restricted to any particular separation of materials and the materials from which the improved apparatus is constructed may be, in general, those commonly used in chemical equipment or special materials and construction as hereinafter described. The new apparatus and process will be described in this specification for purposes of convenience with respect to the separation by means of steam distillation of alcohols, ethers, and the like from mixtures resulting from the hydrolysis of alkyl sulfate liquors.

The principal object of the invention is to provide a new and improved apparatus for separating volatile and non-volatile components of liquid mixtures by vapor distillation. Another object is to provide an improved apparatus which makes possible the distillation of liquids containing corrosive ingredients in an efficient and economical manner. A further object is to provide a novel process for continuously generating alcohols from hydrolized or partially hydrolized alkyl sulfates. The above and other objects will be apparent from the following description and the accompanying drawings, in which Fig. 1 is an elevation of an improved apparatus embodying the invention;

Fig. 2 is a section along line 2—2 of Fig. 1;

Figure 3:
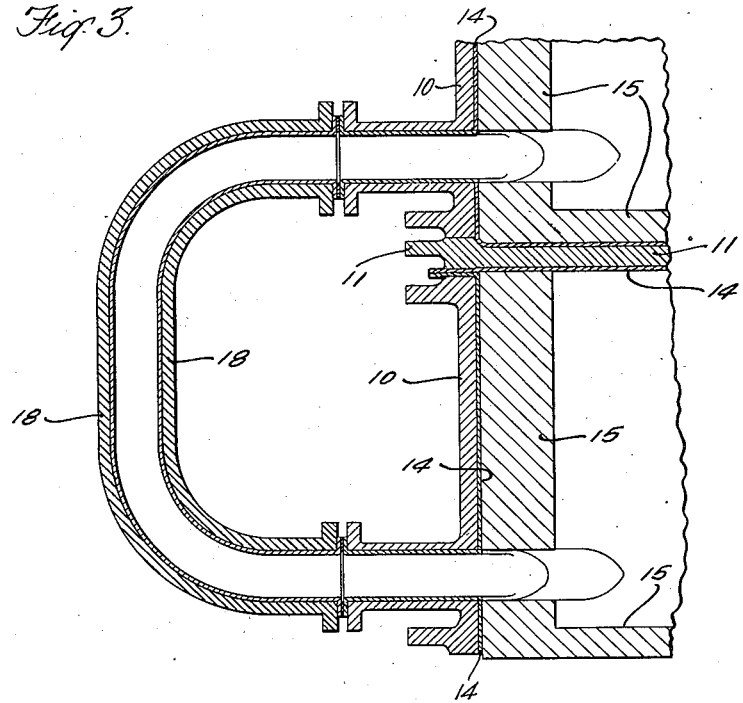
Fig. 3 is an enlarged portion showing the construction at 3 of Fig. 1.
Figure 4:
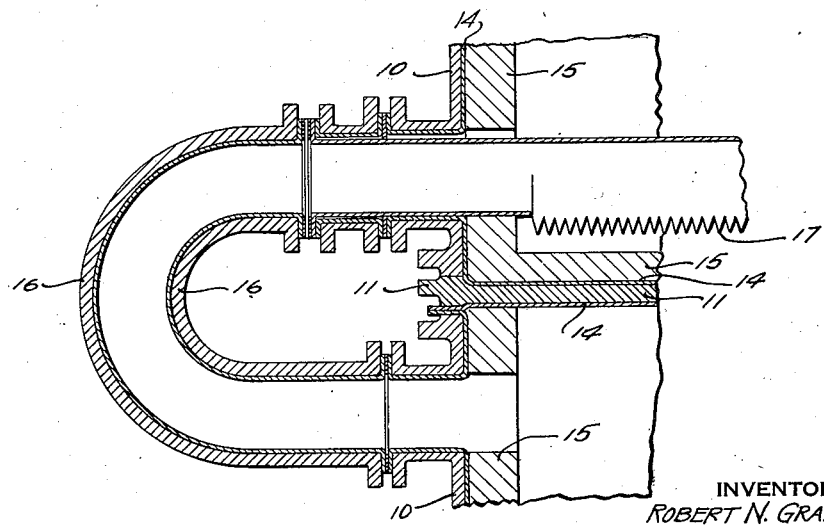
Fig. 4 is an enlarged portion showing the construction at 4 of Fig. 1.

Referring to the drawings, the new apparatus may be embodied in a tower having a shell 10 formed of iron, steel, or similar material, and divided internally into a plurality of sections by horizontal imperforate trays 11 formed of the same material and enclosed by a top 12 and bottom 13 also formed of like material. In the preferred form of the device the shell 10, top 12, and bottom 13 are lined with a sheet of protective material, such as the lead sheet 14, shown in Figs. 3 and 4. The trays 11 are provided on both sides thereof with similar sheets of lead. The shell 10 is further lined with an additional protective material such as acid-resistant brick 15 which also covers each of the trays 11 over the lead sheet 14 and which covers the bottom 13 of the tower. A plurality of vapor conduits 16 placed externally of the shell 10 connect the upper portion of each section to the lower portion of the section adjacent to and immediately above, entering each section just above the brick lining 15 of the tray 11. The vapor conduits 16 are formed of some acid-resistant material, at least on the interior thereof, and may be lead or lead lined iron pipe. Within each section connected to each of the vapor conduits 16 are distributing means for the vapors to be carried by the conduits 16. The distributing means preferably are formed entirely of acid-resistant material and may comprise a closed conduit having a serrated open lower portion, or sparger 17. Each of the sections is connected by a liquid conduit 18 from a point near the bottom of said section to a point near the bottom of the adjacent section below. The liquid conduits 18 connect points just above the trays 11 in each of said sections. The liquid conduits 18 also are preferably constructed of acid-resistant material or lined with acid-resistant material, and may, for example, be formed of lead or lead lined iron pipe. Within each of the sections the flow of liquid from an inlet liquid conduit 18 to an outlet liquid conduit 18 across the tray 11 is caused to take a staggered course by means of an arrangement such as baffles 19 formed, for example, of acid-resistant brick. The distributing means 17 for the vapors from the conduits 16 are then arranged alternately between the baffles 19. The flow of liquid on a typical tray is shown by arrows in Fig. 2. Adjacent trays are of opposite hand. The tower is provided with a vapor outlet 20 located in an upper portion of the tower for separated volatile material and a liquid outlet 21 for separated non-volatile material is located in a lower portion of the tower. An inlet 22 for the liquid mixture to be separated is provided in an upper portion of the tower and inlets 23 for heated vapors by which the distillation is accomplished are provided in a lower section of the tower.

In operation a liquid mixture such as that resulting from the hydrolysis of ethyl sulfates with water is admitted by means of the inlet 22. Steam is admitted near the bottom of the tower by means of the inlets 23 which preferably are provided with sparger pipes or distributing means similar to the distributing means 17 provided on the vapor conduits 16. The liquid mixture to be separated passes down the tower having a staggered flow across each tray 11 and passing from tray to tray down the tower by means of the liquid conduits 18. Hot vapors, alcohol, ether, steam and other volatile products pass up the tower by means of the vapor conduits 16, the vapors having a parallel flow from section to section but which is countercurrent to the flow of liquid down the tower. On each of the trays 11 the heated vapors are passed into intimate contact with the liquid mixture flowing down the tower and the volatile components containing alcohol, ether, ethanol oil (i. e. mainly polymerized ethylene hydrocarbons) and some steam are removed from the tower by means of the outlet 20 to be treated for their values. The separated liquid consists principally of sulfuric acid and is removed as sludge from a lower portion of the tower by means of the outlet 21.

From the foregoing it will be apparent that a simple and efficient apparatus and method for continuously generating alcohols and volatile components from liquid mixtures resulting from the hydrolysis of alkyl sulfates is provided. The process provides for successively bringing the volatilized separated vapors into intimate contact with the liquid mixture to be separated whereby additional volatile components are removed. The original liquid mixture to be treated is first contacted with separated vapors and after the several successive and prolonged contacts therewith during which additional volatile material is progressively removed is finally subjected to the heated vapors by which separation is effected to distill out the last traces of volatile components contained in the liquid. It will be readily apparent that the apparatus and process may be modified to effect like separation of volatile and non-volatile components from liquid mixtures by means of vapor distillation. While the apparatus is particularly adapted for use in the treatment of mixtures containing constituents corrosive to ordinary materials of construction and has been hereindescribed with reference to the use of such corrosive resistant materials, it may be made from ordinary materials and similarly used for the separation of materials which are not detrimentally corrosive thereto. Other modifications of the apparatus and process are possible and are included in the invention as defined by the appended claims.

We claim:—

1. Apparatus for separating volatile and non-volatile components from liquid mixtures by means of vapor distillation, which apparatus comprises a tower divided internally into sections by horizontal imperforate trays; vapor conduits placed externally of said tower directly connecting an upper portion of each section to a lower portion of the adjacent section thereabove; liquid conduits placed externally of said tower connecting a lower portion of each section to a lower portion of the adjacent section therebelow; baffle means within each section to provide a staggered passageway for liquid from the liquid conduit from the adjacent section thereabove to the liquid conduit to the adjacent section therebelow; and distributing means within the lower portions of said sections directly connected to said vapor conduits for rapidly distributing all the vapors coming from the next lower section into intimate and prolonged turbulent contact with liquid within each section at a plurality of points between said baffle means.

2. Apparatus for separating volatile and non-volatile components from liquid mixtures by means of vapor distillation, which apparatus comprises a tower divided internally into sections by horizontal imperforate trays; a plurality of vapor conduits placed externally of said tower directly connecting an upper portion of each section to a lower portion of the adjacent section thereabove; liquid conduits placed externally of said tower connecting a lower portion of each section to a lower portion of the adjacent section therebelow; baffle means within each section to provide a staggered passageway for liquid from the liquid conduit from the adjacent section thereabove to the liquid conduit to the adjacent section therebelow; and a plurality of distributing means within the lower portions of said sections directly connected to said vapor conduits for distributing vapors into intimate contact with liquid within each section, said distributing means being arranged between the baffle means within each section.

3. Apparatus for separating volatile and non-volatile components from liquid mixtures by means of vapor distillation, which apparatus comprises a tower divided internally into sections by horizontal imperforate trays; vapor conduits placed externally of said tower directly connecting an upper portion of each section to a lower portion of the adjacent section thereabove; liquid conduits placed externally of said tower connecting a lower portion of each section to a lower portion of the adjacent section therebelow; baffle means within each section to provide a staggered passageway for liquid from the liquid conduit from the adjacent section thereabove to the liquid conduits to the adjacent section therebelow; and a plurality of parallel distributing means within the lower portions of said sections directly connected to said vapor conduits for rapidly distributing all the vapors coming from the next lower section into intimate and prolonged turbulent contact with liquid within each section between said baffle means, said distributing means comprising closed elongated conduits having serrated open lower portions.

4. Apparatus for separating volatile and non-volatile components from liquid mixtures by means of vapor distillation, which apparatus comprises a tower divided internally into sections by horizontal imperforate trays; a plurality of vapor conduits placed externally of said tower directly connecting an upper portion of each section to a lower portion of the adjacent section thereabove; liquid conduits placed externally of said tower connecting a lower portion of each section to a lower portion of the adjacent section therebelow; baffle means within each section to provide a staggered passageway for liquid from the liquid conduit from the adjacent section thereabove to the liquid conduit to the adjacent section therebelow; and a plurality of distributing means within the lower portions of said sections directly connected to said vapor conduits for distributing vapors into intimate contact with liquid within each section, said distributing means comprising closed elongated conduits having serrated open portions and arranged between said baffle means within each section.

5. Apparatus for separating alcohol and volatile components from liquid mixtures resulting from the hydrolysis of alkyl sulfates by means of steam distillation, which apparatus comprises a tower at least the interior of which is formed of acid-resistant material divided internally into sections by horizontal imperforate trays at least the surfaces of which are formed of acid-resistant material; vapor conduits at least the interiors of which are formed of acid-resistant material placed externally of said tower directly connecting an upper portion of each section to a lower portion of the adjacent section thereabove; liquid conduits at least the interior of which is formed of acid-resistant material placed externally of said tower connecting a lower portion of each section to a lower portion of the adjacent section therebelow; baffle means formed of acid-resistant material within each section to provide a staggered passageway for liquid from the liquid conduit from the adjacent section thereabove to the liquid conduit to the adjacent section therebelow; a plurality of parallel distributing means formed of acid-resistant material between said baffle means within the lower portions of each of said sections directly connected to said vapor conduits for rapidly distributing all the vapors coming from the next lower section into intimate and prolonged turbulent contact with liquid within each section of said tower; and means for admitting said liquid mixture containing hydrolyzed alkyl sulfates into an upper portion of said tower; means for admitting steam into a lower portion of said tower and means for removing separated alcohol and volatile components and separated acid liquid from upper and lower portions respectively of said tower.

6. Apparatus for separating volatile and nonvolatile components from liquid mixtures by means of vapor distillation, which apparatus comprises a tower at least the interior surface of which is formed of acid-resisting material divided internally into sections by horizontal imperforate trays at least the surfaces of which are formed of acid-resisting material; vapor conduits at least the interior being formed of acid-resisting material placed externally of said tower directly connecting an upper portion of each section to a lower portion of the adjacent section thereabove; liquid conduits at least the interior being formed of acid-resisting material placed externally of said tower connecting a lower portion of each section to a lower portion of the adjacent section therebelow; baffle means within each section to provide a staggered passageway for liquid from the liquid conduit from the adjacent section thereabove to the liquid conduit to the adjacent section therebelow; and distributing means formed of acid-resisting material within the lower portions of said sections directly connected to said vapor conduits for rapidly distributing all the vapors coming from the next lower section into intimate and prolonged turbulent contact with liquid within each section at a plurality of points between said baffle means.

ROBERT N. GRAHAM.
WILLIAM S. BRACKETT.